(12) United States Patent
Sugita et al.

(10) Patent No.: US 9,068,249 B2
(45) Date of Patent: Jun. 30, 2015

(54) RARE EARTH ELEMENT RECOVERY METHOD

(71) Applicant: NIPPON LIGHT METAL COMPANY, LTD., Tokyo (JP)

(72) Inventors: Kaoru Sugita, Shizuoka (JP); Yuji Ota, Shizuoka (JP); Yoshihiro Taguchi, Shizuoka (JP); Satoshi Takeda, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/363,676

(22) PCT Filed: Dec. 7, 2012

(86) PCT No.: PCT/JP2012/081856
§ 371 (c)(1),
(2) Date: Jun. 6, 2014

(87) PCT Pub. No.: WO2013/085052
PCT Pub. Date: Jun. 13, 2013

(65) Prior Publication Data
US 2014/0283652 A1      Sep. 25, 2014

(30) Foreign Application Priority Data

Dec. 9, 2011    (JP) .................................. 2011-270145

(51) Int. Cl.
C22B 3/00        (2006.01)
C22B 3/44        (2006.01)
(Continued)

(52) U.S. Cl.
CPC . *C22B 59/00* (2013.01); *C22B 3/06* (2013.01); *C22B 3/065* (2013.01); *C22B 3/10* (2013.01); *C22B 3/0067* (2013.01); *B09B 3/0016* (2013.01)

(58) Field of Classification Search
CPC ............ C22B 3/06; C22B 3/065; C22B 3/10; C22B 3/44; C22B 3/0067; C22B 59/00
See application file for complete search history.

(56) References Cited

U.S. PATENT DOCUMENTS

| 4,814,139 | A |   | 3/1989 | Tokunaga et al. |
| 5,030,424 | A | * | 7/1991 | Fulford et al. ............... 423/21.5 |

(Continued)

FOREIGN PATENT DOCUMENTS

| CN | 102127642 B | * | 8/2012 |
| JP | 59-46008 A |   | 3/1984 |

(Continued)

OTHER PUBLICATIONS

Machine translation of CN 102127642 published Aug. 2012.*

(Continued)

*Primary Examiner* — George Wyszomierski
*Assistant Examiner* — Tima M McGuthry Banks
(74) *Attorney, Agent, or Firm* — Birch, Stewart, Kolasch & Birch, LLP

(57) ABSTRACT

Provided is a method of recovering rare-earth elements, including causing rare-earth elements particularly including Nd and Dy to leach efficiently from a raw material for leaching which contains the rare-earth elements, and separating and recovering the rare-earth elements. The method of recovering rare-earth elements includes: a leaching step including performing leaching treatment of rare-earth elements in which an acidic slurry of a raw material for leaching which contains the rare-earth elements is held under a predetermined condition, and then subjecting the slurry obtained after the leaching treatment to solid-liquid separation, yielding a leachate containing the rare-earth elements; and a separation step of separating and recovering the rare-earth elements from the yielded leachate, in which: the raw material for leaching contains Ca as CaO at a ratio of 4 to 15 mass % and Ti as $TiO_2$ at a ratio of 2 to 13 mass % in a solid component (S); an acid aqueous solution is an acid aqueous solution of hydrochloric acid and/or nitric acid; and the leaching treatment performed in the leaching step is digestion or maceration which is performed under the heating and pressurizing conditions of a temperature of 160 to 300° C. and a pressure of 0.65 to 10 MPa, and the rare-earth elements are caused to leach together with Ca in the leaching step.

27 Claims, 1 Drawing Sheet

(51) Int. Cl.
*C22B 59/00* (2006.01)
*C22B 3/10* (2006.01)
*C22B 3/06* (2006.01)
*C22B 3/38* (2006.01)
*B09B 3/00* (2006.01)

(56) References Cited

U.S. PATENT DOCUMENTS 5,622,679 A 4/1997 Yuan et al.
5,787,332 A 7/1998 Black et al.

FOREIGN PATENT DOCUMENTS

| JP | 62-165305 A | 7/1987 |
| JP | 9-184028 A | 7/1997 |
| JP | 10-212532 A | 8/1998 |
| JP | 2000-313928 A | 11/2000 |
| RU | 2293134 C1 * | 2/2007 |

OTHER PUBLICATIONS

The International Preliminary Report on Patentability and an English translation of the Written Opinion of the International Searching Authority, dated Jun. 19, 2014, issued in the corresponding International Application No. PCT/JP2012/081856.

International Search Report for PCT/JP2012/081856 mailed on Mar. 26, 2013.

* cited by examiner

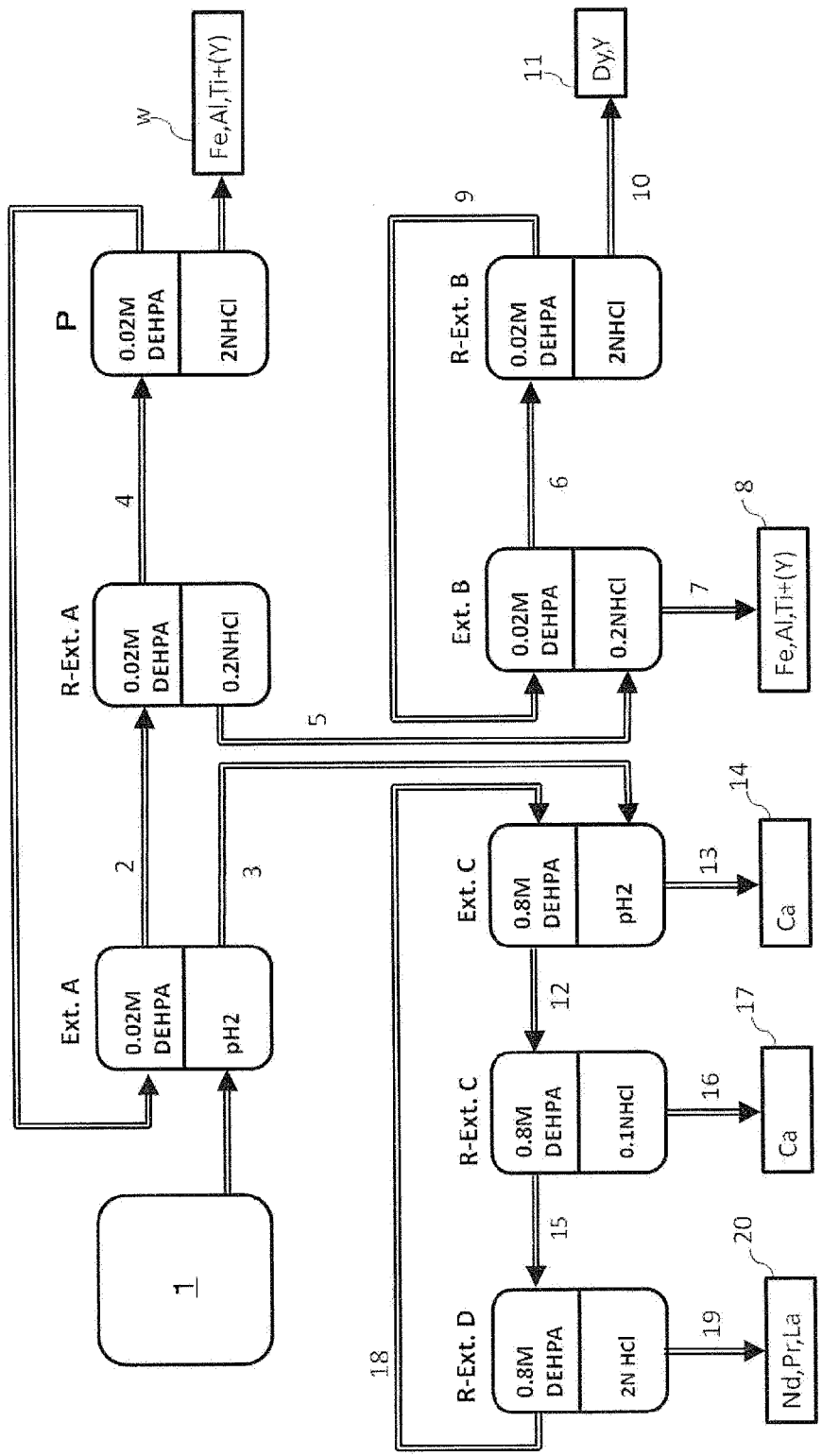

RARE EARTH ELEMENT RECOVERY METHOD

TECHNICAL FIELD

The present invention relates to a method of recovering rare-earth elements involving causing rare-earth elements, in particular, rare-earth elements including Nd and Dy, which are highly useful as materials for an Nd—Fe—B-based permanent magnet, to leach from a raw material for leaching which contains rare-earth elements, and separating and recovering the rare-earth elements, and more particularly, to a method of recovering rare-earth elements involving causing rare-earth elements to leach efficiently together with Ca from a raw material for leaching which contains Ca and Ti, and separating and recovering the rare-earth elements.

BACKGROUND ART

Rare-earth elements have been widely used in applications such as a phosphor, a magnetic substance, an abrasive, and a catalyst. Particularly in the magnetic substance, the use of the rare-earth elements as materials for a permanent magnet has been rapidly expanding because a magnet having a large maximum energy product and a large residual magnetic flux density can be obtained by adding the rare-earth elements to transition elements. For example, Patent Literature 1 discloses materials for an Nd—Fe—B-based permanent magnet having an excellent maximum energy product and an excellent residual magnetic flux density. In addition, Patent Literature 2 discloses a technology for improving the thermal stability of magnetic characteristics, which is a defect of the Nd—Fe—B-based permanent magnet, by substituting part of Nd with Dy in the permanent magnet.

For example, ores such as monazite, bastnaesite, xenotime, and ion adsorption clay mineral are used as raw materials for such rare-earth elements. The rare-earth elements are caused to leach from any of these ores by using an acid aqueous solution, for example, an aqueous solution of a mineral acid such as sulfuric acid, and the rare-earth elements are separated and collected from the resultant leachate. However, these ore resources are unevenly distributed on the earth, and the abundance of each element in the rare-earth elements significantly varies for each ore. In particular, there are very few mines in which ores containing heavy rare-earth elements having atomic numbers of 64 to 71 and having high mine profitability can be mined, and it is concerned that the depletion of the resources of Dy, which is in especially high demand, may occur.

On the other hand, the rare-earth elements are also contained in bauxite, which exists as a resource abundantly and which is an ore resource of aluminum. It is known that the rare-earth elements are caused to dissolve from bauxite and are then separated and recovered (see, for example, paragraph 0003 in Patent Literature 3). Further, it is also known that rare-earth elements are caused to leach by using, as a raw material, a solid residue produced as a by-product in a Bayer process and remaining after the collection of aluminum in the production of aluminum from the bauxite through the steps of the Bayer process and a Hall-Héroult process (The solid residue is hereinafter referred to as "bauxite residue". A bauxite residue containing $Fe_2O_3$ as a main component has a red color and is generally called "red mud".) and are then separated and recovered (Patent Literature 4).

In addition, the rare-earth elements are stable in an alkaline aqueous solution by taking the forms of compounds such as oxides and hydroxides, and the compounds do not react with a solution of sodium hydroxide even when the solution is heated and pressurized. Thus, in the bauxite residue, the rare-earth elements are to be concentrated to the extent corresponding to the amount of the aluminum component caused to leach with the solution of sodium hydroxide in the Bayer process described above. According to studies of the inventors of the present invention, the bauxite residue contains rare-earth elements about three times on the average in comparison to the content of rare-earth elements in the bauxite. Further, the bauxite residue is an industrial waste which is produced in the production of aluminum from bauxite, and is stably produced as a by-product in the production of aluminum, and hence can be easily obtained. Therefore, the bauxite residue is expected to be used as a raw material for rare-earth elements.

However, detailed examination of Patent Literature 4 above has revealed that, as described in Examples 1 and 2 thereof, a bauxite residue containing, in a dried state, 52.0% of $Fe_2O_3$, 6.5% of $TiO_2$, 18.0% of ignition loss, 12.9% of $Al_2O_3$, 2.4% of $SiO_2$, 1.6% of $Na_2O$, 5.0% of CaO, and 0.6% of $P_2O_5$ is used as a raw material, and a leaching operation (leaching, or digestion or maceration) is repeated two or three times at 10 to 70° C. by using a sulfurous acid solution having a high pH value and a sulfurous acid solution having a low pH value to adjust the final ph value to 1.35 to 2.4. Accordingly, rare-earth elements are caused to leach while keeping the dissolution of Fe and Ti contained in the bauxite residue at a low level, and the rare-earth elements are then separated and recovered by using a solvent extraction method. In this case, although 50 to 85% of the content of Y in the bauxite residue are caused to leach and the leaching ratio of Dy is not described, in a leaching time of 20 minutes, which is considered to be preferred to almost saturate the leaching amount of the rare-earth elements without continuously increasing the leaching amount of Fe, the leaching ratio of Nd is lower than that of Y and is only about 58% (see the descriptions on lines 32 to 36 in column 7, Tables 1 to 3, and FIG. 2 in Patent Literature 4).

That is, the technology described in Examples 1 and 2 of Patent Literature 4 involves repeating the leaching operation two or three times, and hence, as the amount of a leachate increases, the cost of the leaching step increases at the time of causing rare-earth elements to leach from a bauxite residue because, for example, it is required to repeat solid-liquid separation two or three times. Moreover, the liquid-solid ratios at the time of the leaching operations are set to 4:1 and 10:1 in digestion or maceration carried out twice in Example 1 (see Table 1) and set to 4:1 and 8:1 in digestion or maceration carried out twice in Example 2 (see Table 3). Accordingly, the amount of a leachate becomes 14 times or 12 times the amount of the bauxite residue serving as a raw material. Thus, this technology has a problem in that a solvent extraction apparatus in the separation step of separating and recovering rare-earth elements from the leachate by the solvent extraction method is increased in size and the cost thereof is also increased.

By the way, the inventors of the present invention used 0.102 kg of a bauxite residue having the same composition as that of the bauxite residue used in Examples to be described below, and followed the experiment in Example 1 of Patent Literature 4, which involves using an aqueous solution of sulfurous acid as an acid aqueous solution and repeating the same leaching operation three times under the conditions of a liquid-solid ratio (L/S) of 5.0, a temperature of 30° C., a pressure of 0.1 MPa, and a time of 15 minutes. The results are as shown in Table 1. In the first leaching operation, the leaching ratio of Y merely reached 5 mass % or less, and the total leaching ratio of Y additionally including the leaching ratios of the second and third leaching operations was 52 mass %. However, the leaching ratios of Nd and Dy merely reached 41 mass % and 43 mass %, respectively, which were merely even lower values in comparison to the leaching ratio of Y.

TABLE 1

| Usage of bauxite residue | | kg | 0.102 |
|---|---|---|---|
| First leaching | Kind of acid | | $H_2SO_3$ |
| | Liquid-solid ratio | | 5.0 |
| | Leaching conditions | Temperature °C. | 30 |
| | | pH After completion of leaching | 3.27 |
| | | Time Minutes | 15 |
| Second leaching | Kind of acid | | $H_2SO_3$ |
| | Liquid-solid ratio | | 5.0 |
| | Leaching conditions | Temperature °C. | 30 |
| | | pH Initial stage of leaching | 2.05 |
| | | After completion of leaching | 3.20 |
| | | Time Minutes | 15 |
| Third leaching | Kind of acid | | $H_2SO_3$ |
| | Liquid-solid ratio | | 5.0 |
| | Leaching conditions | Temperature °C. | 30 |
| | | pH Initial stage of leaching | 1.21 |
| | | After completion of leaching | 1.82 |
| | | Time Minutes | 15 |
| pH value | Initial stage of leaching | | 3.3 |
| | After leaching | | 1.2 |
| Leaching ratio (mass %) | Y | | 52 |
| | Nd | | 41 |
| | Dy | | 43 |
| | Ca | | 88 |
| | Al | | 40 |
| | Si | | 99 |
| | Ti | | 0.3 |
| | Fe | | 0.2 |

CITATION LIST

Patent Literature

[PTL 1] JP 59-046008 A
[PTL 2] JP 62-165305 A
[PTL 3] JP 09-184028 A
[PTL 4] U.S. Pat. No. 5,030,424 A

SUMMARY OF INVENTION

Technical Problem

In view of the foregoing, the inventors of the present invention have made studies on the causes of the low leaching ratio of rare-earth elements, in particular, Nd and Dy in the leaching operation of rare-earth elements contained in the bauxite residue, and have reached the following conclusion.

That is, when aluminum is produced by a Bayer process using bauxite as a raw material, the bauxite is mixed with an aqueous solution of sodium hydroxide, the mixture is heated and pressurized, thereby causing its aluminum component to dissolve as aluminate ions, the resultant eluate containing the aluminum component is cooled, thereby causing the aluminate ions to precipitate as aluminum hydroxide, and the aluminum hydroxide is calcined to collect aluminum oxide. In the Bayer process, CaO is often added in order to recover, as sodium hydroxide, a sodium compound produced by a reaction between a component in the bauxite and the aqueous solution of sodium hydroxide and to remove impurities such as Si and P, and hence CaO is usually contained in the bauxite residue at 4 to 15 mass %.

Then, in the Bayer process, when CaO is added into a sodium aluminate solution having as high a temperature as 160° C. or more, Ti contained in the bauxite reacts with Ca added as CaO, producing calcium titanate ($CaTiO_3$), which forms a crystal having a perovskite (ABX3)-type structure. Further, when the produced calcium titanate forms a crystal, parts of rare-earth elements such as Nd and Dy contained in the bauxite are incorporated into the crystal. Besides, the crystal formed of the calcium titanate ($CaTiO_3$) and having a perovskite (ABX3)-type structure does not easily dissolve in a mineral acid at less than 160° C., and hence the inventors of the present invention have consequently concluded that it is difficult to increase its leaching ratio by performing a usual leaching operation.

In view of the foregoing, the inventors of the present invention have further studied intensively a method involving: causing rare-earth elements to leach efficiently from a raw material for leaching which contains compounds such as calcium titanate, which forms the crystal having a perovskite (ABX3)-type structure as described above, the rare-earth elements including rare-earth elements such as Nd and Dy incorporated in the crystal; and separating and recovering the rare-earth elements from the resultant leachate. As a result, the inventors have found that, surprisingly, the crystal having a perovskite (ABX3)-type structure can be easily dissolved by performing digestion or maceration with a particular acid aqueous solution under particular heating and pressurizing conditions, and hence it is possible to not only cause, as a matter of course, the rare-earth elements not incorporated in the crystal to leach easily, but also cause the rare-earth elements incorporated in the crystal to leach easily. Thus, the present invention has been completed.

Therefore, an object of the present invention is to provide a method of recovering rare-earth elements involving causing rare-earth elements, in particular, rare-earth elements including Nd and Dy to leach efficiently from a raw material for leaching which contains the rare-earth elements, and separating and recovering the rare-earth elements.

Solution to Problem

That is, according to one embodiment of the present invention, there is provided a method of recovering rare-earth elements, including:

a leaching step including preparing a slurry by adding water to a raw material for leaching which contains rare-earth elements, followed by mixing, further adding an acid aqueous solution to the slurry, followed by mixing, to adjust a pH of the slurry, performing leaching treatment in which the rare-earth elements in the raw material for leaching are transferred into the acid aqueous solution while the resultant slurry is held under a predetermined condition, and then subjecting the slurry obtained after the leaching treatment to solid-liquid separation, yielding a leachate containing the rare-earth elements; and a separation step of separating and recovering the rare-earth elements from the leachate yielded in the leaching step, in which:

the raw material for leaching includes Ca as CaO at a ratio of from 4 to 15 mass % and Ti as $TiO_2$ at a ratio of from 2 to 13 mass % in a solid component (S) obtained by drying the raw material for leaching under drying conditions of 110° C. and 2 hours;

the acid aqueous solution includes an acid aqueous solution which contains hydrochloric acid and/or nitric acid and adjusts the pH to from 0 to 2.7; and the leaching treatment performed in the leaching step is digestion or maceration which is performed under heating and pressurizing conditions of a temperature of from 160 to 300° C. and a pressure of from 0.65 to 10 MPa, and the rare-earth elements in the raw material for leaching are caused to leach together with Ca in the leaching step.

In the present invention, it is desirable that the digestion or maceration in the leaching step be performed until the dissolution ratio of Ca contained in the raw material for leaching reaches 90 mass % or more, and consequently, rare-earth elements including Y and also including Nd and Dy, which are highly useful, can be recovered at as high a leaching ratio as more than 70 mass %.

Herein, in the present invention, the term "rare-earth elements" is used to refer collectively to Y with an atomic number of 39 and La to Lu with atomic numbers of 57 to 71. According to the method of the present invention, Sc with an atomic number of 21 and Ac to Lr with atomic numbers of 89 to 103 are caused to leach, but the present invention does not deny the possibility that these elements are caused to leach and are separated and recovered.

In the present invention, the raw material for leaching which contains rare-earth elements is not particularly limited as long as the raw material for leaching contains rare-earth elements such as Y, Nd, and Dy and contain Ca as CaO at a ratio of 4 to 15 mass % and Ti as $TiO_2$ at a ratio of 2 to 13 mass %. The raw material for leaching which contains rare-earth elements is preferably a bauxite residue produced as a by-product in a Bayer process for causing an aluminum component to leach from bauxite by using an aqueous solution of sodium hydroxide, more preferably a bauxite residue including rare-earth elements as oxides thereof at a ratio of 500 to 10,000 ppm in a solid component (S) obtained by drying the bauxite residue under the drying conditions of 110° C. and 2 hours. Such bauxite residues are produced as by-products in a Bayer process for collecting an aluminum component from bauxite, in particular, a Bayer process in which a sodium component is recovered as sodium hydroxide and CaO is added to remove impurities such as Si and P, and hence the bauxite residues are easily available in a large quantity.

Herein, Ca and Ti in the bauxite residue are considered to form a crystal having a perovskite (ABX3)-type structure. In the crystal having a perovskite (ABX3)-type structure, cations in the A site and anions in the X site have almost the same size, and inside the cubic lattice of the crystal structured by the A site and the X site, cations each having a smaller size than the cations in the A site are located in the B site. In the crystal having a perovskite (ABX3)-type structure, elements are densely coordinated and are stable in a high pressure state. The size of ions in the A site and B site is allowable in the range of a tolerance factor of t=0.75 to 1.1. Further, when oxygen is located in the X site, elements are chosen so that the valencies of the A site and B site satisfy the equation A+B=6. Thus, various elements can be dissolved in the A site and B site as long as those elements satisfy the valencies and tolerance factor. Each rare-earth element has a large ionic radius and is trivalent, and hence it is considered that the rare-earth element is dissolved as a pair with an Fe ion, which has a smaller ionic radius and is trivalent. Note that the tolerance factor t is represented by the following equation.

$$t = \frac{(\text{ionic radius at } A \text{ site}) + (\text{ionic radius at } X \text{ site})}{\sqrt{2} \times \{(\text{ionic radius at } B \text{ site}) + (\text{ionic radius at } X \text{ site})\}}$$

Advantageous Effects of Invention

According to one embodiment of the present invention, it is possible to cause rare-earth elements including not only Y but also Nd and Dy, which are highly useful, to leach efficiently and easily, followed by separation and recovery of the rare-earth elements, from a raw material for leaching which is, for example, a bauxite residue that is generated as an industrial waste when aluminum is produced from bauxite, and which includes Ca as CaO at a ratio of 4 to 15 mass % and Ti as $TiO_2$ at a ratio of 2 to 13 mass %. As a result, resources in a bauxite raw material can be utilized effectively, and it is possible to eliminate concerns such as the uneven distribution of raw material ores for rare-earth elements, the variation in the abundance of each element in the rare-earth elements for each ore, and the depletion of the resources of rare-earth elements.

BRIEF DESCRIPTION OF DRAWINGS

FIG. 1 is a flow chart illustrating the removal of impurity elements in a leachate and the concentration of rare-earth elements in the leachate performed by a two-stage solvent extraction method according to Example 53 of the present invention.

DESCRIPTION OF EMBODIMENTS

Hereinafter, embodiments of the present invention are specifically described by taking as an example a case where a raw material for leaching which contains rare-earth elements is a bauxite residue.

First, in a leaching step, an acid aqueous solution is added to the bauxite residue, followed by mixing, thereby preparing a slurry. The acid aqueous solution to be used here is desirably an acid aqueous solution containing hydrochloric acid and/or nitric acid, which does not form an insoluble compound with Ca in the bauxite residue even if the slurry is heated to 160° C. or more.

Further, it is desirable that the slurry to be prepared have a liquid-solid ratio (L/S) of a liquid component (L) and a solid component (S) of preferably 2 or more and 10 or less, more preferably 2 or more and 10 or less, and have a pH value of preferably 0 or more and 2.7 or less, more preferably 0 or more and 2.5 or less. When the prepared slurry has a liquid-solid ratio (L/S) of less than 2, the leaching ratio of rare-earth elements reduces to an insufficient level, and the viscosity of the slurry increases, with the result that it is difficult to handle the slurry in the subsequent separation step. On the other hand, even when the liquid-solid ratio (L/S) is adjusted to more than 10, the leaching ratio of rare-earth elements is saturated and does not improve, and, in addition, the amount of a leachate increases, with the result that a load in the subsequent separation step is too high. Further, when the prepared slurry has a pH value of higher than 2.7, the leaching ratio of rare-earth elements reduces to an insufficient level. On the other hand, when the pH value is adjusted to less than 0, the dissolution amounts of Al and Fe increase, with the result that it is difficult to separate rare-earth elements, and the acid and a pH adjuster to be described below are consumed more, causing an increase in cost, which is not preferred.

Further, in the slurry prepared by adding the acid aqueous solution to the bauxite residue, it is desirable to add an oxidizing agent at a ratio of 0.1 to 1 equivalent weight, preferably at a ratio of 0.15 to 0.4 equivalent weight, with respect to an Fe component in the bauxite residue, for the purpose of converting $Fe^{2+}$ ions in the slurry which are derived from the bauxite residue to $Fe^{3+}$ ions, thereby facilitating an operation for causing Fe and Al to precipitate and be separated in the subsequent separation step. The oxidizing agent to be added for this purpose may be exemplified preferably by a hydrogen peroxide solution and a perchloric acid aqueous solution, more preferably by a 30-mass % hydrogen peroxide solution and a 70-mass % perchloric acid aqueous solution. When the addition amount of the oxidizing agent is less than 0.1 equivalent weight, there arises a problem in that $Fe^{2+}$ ions remain in the leachate even in the state of a high pH. In contrast, even when the addition amount of the oxidizing agent is more than 1 equivalent weight, there arises a problem in that the effect of the oxidizing agent remains unchanged, and hence the oxidizing agent excessively added is used wastefully.

Next, in the present invention, leaching treatment of rare-earth elements is performed while the slurry thus obtained is held under a predetermined condition. Digestion or maceration is carried out as the leaching treatment under the heating and pressurizing conditions of a temperature of 160° C. or more and 300° C. or less, preferably 180° C. or more and 250° C. or less, and a pressure of 0.65 MPa or more and 10 MPa or less, preferably 1 MPa or more and 5 MPa or less, for a holding time of 30 minutes or more and 160 minutes or less, preferably 40 minutes or more and 120 minutes or less. The reason why the digestion or maceration is carried out under such heating and pressurizing conditions as the leaching treatment of rare-earth elements is as follows: Ca and Ti existing in the bauxite residue at predetermined ratios exist as compounds forming crystals having a perovskite-type structure, rare-earth elements such as Nd and Dy, which are highly useful, are incorporated in such crystals having a perovskite-type structure, and hence the digestion or maceration is carried out under such heating and pressurizing conditions to allow the crystals having a perovskite-type structure to dissolve, thereby causing the rare-earth elements to leach.

Herein, when the digestion or maceration operation is carried out at a temperature of less than 160° C., even if the pressure and the holding time are set to necessary and proper conditions, it is difficult to cause rare-earth elements to leach sufficiently, and it is difficult to cause 70 mass % or more of the rare-earth elements contained in the bauxite residue to leach. In contrast, when the temperature is more than 250° C., the leaching ratio of rare-earth elements shows an almost saturated state. Further, heating at more than 300° C. causes an increase in the amount of necessary heat, degradation of a pressure vessel, an increase in cost, and the like. Meanwhile, when the digestion or maceration operation is carried out under a pressure of less than 0.65 MPa, even if the temperature and the holding time are set to necessary and proper conditions, it is difficult to cause rare-earth elements to leach sufficiently, and it is difficult to cause 70 mass % or more of the rare-earth elements contained in the bauxite residue to leach. In contrast, the digestion or maceration operation carried out under a pressure of more than 10 MPa results in applying an unnecessarily high pressure, causing degradation of a pressure vessel, an increase in cost, and the like. Further, when the digestion or maceration operation is carried out for a holding time of less than 30 minutes, even if the temperature and the pressure are set to necessary and proper conditions, stable operation is difficult because of such short holding time, the leaching ratio of rare-earth elements cannot be stabilized, and hence it is difficult to cause 70 mass % or more of the rare-earth elements contained in the bauxite residue to leach. In contrast, when the holding time is more than 160 minutes, the leaching ratio of rare-earth elements shows an almost saturated state.

In the the present invention, in the leaching treatment (digestion or maceration) carried out under such heating and pressurizing conditions, rare-earth elements contained in the bauxite residue, in particular, rare-earth elements including Nd and Dy leach together with Ca, and hence it is desirable to carry out the digestion or maceration by using, as an index, the leaching ratio of Ca, which is more abundant than the rare-earth elements, and it is desired to carry out the digestion or maceration until the leaching ratio of Ca exceeds 90 mass %. Carrying out the digestion or maceration until the leaching ratio of Ca exceeds 90 mass % enables more than 70 mass % of the rare-earth elements contained in the bauxite residue to leach certainly.

The slurry after the leaching treatment is then subjected to solid-liquid separation by means selected from, for example, filtration, centrifugal separation, and decantation, and a leachate including rare-earth elements together with Ca is recovered. It is preferred that the solid residue yielded by the solid-liquid separation be washed with washing water so that the leachate attached to the solid residue may be transferred into the washing water and recovered, and both the recovered leachate and the leachate previously yielded by the solid-liquid separation of the slurry after the leaching treatment be used as a leachate to be treated in the subsequent separation step. When the amount of the washing water to be used for washing the solid residue is too small, the leachate attached to the solid residue cannot be recovered sufficiently. In contrast, when the amount of the washing water to be used is too large, a larger burden is applied in the subsequent separation step. Thus, the ratio of the washing water (L) to the solid residue (S), that is, the liquid-solid ratio (L/S), desirably falls within the range of 2 to 10 in ordinary cases.

The above-mentioned leaching step was described by taking as an example the case where a raw material for leaching is a bauxite residue which is a solid residue obtained after aluminum hydroxide was caused to dissolve from bauxite by a Bayer process. The raw material for leaching to be used in the leaching step has only to contain rare-earth elements and contain Ca at a ratio of 4 to 15 mass % and Ti at a ratio of 2 to 13 mass %. The raw material for leaching is not particularly limited to the bauxite residue.

The leachate yielded by the above-mentioned leaching step is then transferred to the separation step of separating and recovering rare-earth elements.

In the separation step of separating rare-earth elements from the leachate, there is used, as a separation method, an oxalate precipitation method, a hydroxide precipitation method, or a solvent extraction method.

In the present invention, in which the dissolution amounts of Fe and Ti are small, the leachate can be directly treated by an oxalate precipitation method or a solvent extraction method. However, when the dissolution amount of Al or Fe is large, and the amounts of chemicals used in the solvent extraction method or the oxalate precipitation method increase. Therefore, it is preferred to decrease the amount of the leachate through pretreatment in order to reduce the cost.

A method of the pretreatment is exemplified as follows. Because the pH value of the leachate yielded in the leaching step usually falls within the range of 1 to 3, a pH adjuster is first added to the leachate so as to adjust the pH value thereof to 4 to 6, and hydroxides of Fe and Al precipitated by this pH adjustment are removed by solid-liquid separation. The pH adjuster to be used for this purpose is not particularly limited, and sodium hydroxide, potassium hydroxide, calcium hydroxide, ammonia, or the like is suitably used.

When the pH adjustment of the leachate is performed, an oxidizing agent is desirably added as required, thereby oxidizing $Fe^{2+}$ ions into $Fe^{3+}$ ions in the leachate. With this, insoluble $Fe(OH)_3$ is stabilized, which facilitates the separation and removal of Fe. It is possible to use suitably, as the oxidizing agent, for example, hydrogen peroxide, perchloric acid, permanganic acid, hypochlorous acid, or the like. When hydrogen peroxide is used as the oxidizing agent, the concentration of the oxidizing agent influences only the liquid-solid ratio, and hence a proper concentration can be selected in consideration of the ease of handling and the cost. When the raw material for leaching is the bauxite residue, in both the case of using a 30-mass % hydrogen peroxide solution and the case of using a 70-mass % perchloric acid aqueous solution, the addition amount of the oxidizing agent is preferably 0.1 to 0.5 equivalent weight with respect to the amount of an Fe component in the bauxite residue.

In the hydroxide precipitation method, in order to separate rare-earth elements as their hydroxides, a pH adjuster is further added to the leachate yielded in the above-mentioned leaching step or a liquid yielded by adjusting the pH of the leachate to cause Fe and Al to precipitate as their hydroxides, followed by solid-liquid separation, thereby adjusting the pH value to 7 or more, Ca and the rare-earth elements are caused to precipitate as their hydroxides, and the hydroxides of Ca and the rare-earth elements are subjected to solid-liquid separation and recovered as a crude recovered product. The pH adjuster is preferably sodium hydroxide, potassium hydroxide, calcium hydroxide, ammonia, or the like, and Ca and the rare-earth elements are precipitated as their hydroxides. The precipitated hydroxides are subjected to solid-liquid separation, thereby recovering the hydroxides of the rare-earth elements. Alternatively, it is preferred that, for the purpose of reducing the concentration of Al, which is an impurity, a sodium hydroxide solution be added to the precipitated hydroxides of the rare-earth elements at 5 or more equivalent weights with respect to the Al, thereby causing the Al component to dissolve as aluminate ions and removing the Al component.

In the oxalate precipitation method, oxalic acid is added to the leachate yielded in the above-mentioned leaching step or a liquid yielded by adjusting the pH of the leachate to cause Fe and Al to precipitate as their hydroxides, followed by solid-liquid separation, at 1.3 to 6 equivalent weights with respect to the total number of moles of the rare-earth elements existing in the leachate or the liquid, yielding insoluble rare-earth oxalates, and solid-liquid separation is then performed, thereby recovering crude rare-earth compounds (crude recovered product) as rare-earth oxalate compounds.

When crude rare-earth compounds (crude recovered product) are recovered by a solvent extraction method from the leachate yielded in the above-mentioned leaching step or a liquid yielded by adjusting the pH of the leachate to cause Fe and Al to precipitate as their hydroxides, followed by solid-liquid separation, the solvent extraction method may be performed by a known method. It is possible to use suitably an extractant prepared by diluting an ester such as a phosphoric acid ester (DEHPA or EHPA), a phosphonic acid ester (PC88A), or a phosphinic acid ester (Cyanex 272 or Cyanex 30) with a solvent such as an aliphatic hydrocarbon such as hexane, which is a non-polar organic solvent, an aromatic hydrocarbon such as benzene or toluene, an alcohol such as octanol, or kerosene, which is a petroleum fraction.

It is also preferred to carry out the recovery of a crude recovered product by a solvent extraction method through two or more stages. When a crude recovered product is recovered by the solvent extraction method through two or more stages, rare-earth elements can be separated into each element.

When the solid residue (bauxite residue) remaining after aluminum hydroxide is caused to dissolve from bauxite by a Bayer process is used as the raw material for leaching and crude rare-earth compounds (crude recovered product) are recovered by a solvent extraction method from the leachate yielded in the above-mentioned leaching step, it is preferred that the pH of the leachate be initially adjusted to 2.5 to 3.5, the resultant precipitate be removed, and solvent extraction be performed or the pH of the leachate be re-adjusted to 1.2 to 2.5, followed by solvent extraction. When the pH is adjusted and the precipitate is removed as described above, it is possible to prevent the occurrence of an emulsion or a suspension (hereinafter referred to as "emulsion") produced, for example, between the organic phase and aqueous phase at the time of the solvent extraction. When the emulsion occurs, the resultant precipitate can be removed by filtration. It is not preferred that the pH of the aqueous phase be less than 1.2 at the time of solvent extraction because the recovery ratio of rare-earth elements lowers.

It is also suitable to add a bauxite residue to perform such pH adjustment as described above. When pH adjustment is performed by addition of a bauxite residue, the amount of alkaline chemicals used can be suppressed, and, because the bauxite residue is produced as a by-product in a Bayer process for producing aluminum from bauxite, the cost can be reduced as a result. Further, when pH adjustment is performed by addition of a bauxite residue, rare-earth elements contained in the added bauxite residue dissolve in the leachate, and hence the acid aqueous solution used in the leaching treatment can be effectively used, and the rare-earth elements that leach from the added bauxite residue can be recovered. Moreover, in this case, Ca and Ti coprecipitate with Fe, the concentrations of these elements in the leachate lower, and the rare-earth elements can be efficiently recovered as a result.

Further, in such case, it is preferred that DEHPA (chemical name: bis(2-ethylhexyl) hydrogen phosphate) be used as an extractant and diluted with a solvent so as to have a concentration of 0.1 to 1.5 M because the extraction ratio of Al can be kept low, and the concentration of rare-earth elements separated and recovered can be increased as a result. The extraction time is preferably 5 minutes or less, more preferably 0.5 to 3 minutes. When the extraction time is 0.5 to 3 minutes, the extraction ratio of Al can be kept low, and the concentration of rare-earth elements separated and recovered can be increased as a result. When the extraction time is more than 5 minutes, the extraction ratio of Al becomes high, and the concentration of rare-earth elements separated and recovered reduces as a result.

When DEHPA is used as an extractant, it is also suitable that pre-extraction be preliminarily performed by using PC88A (chemical name: mono-2-ethylhexyl 2-ethylhexyl phosphonate), tributyl phosphate, or naphthenic acid as a pre-extractant. When such pre-extraction is performed, the concentrations of elements such as Fe, Sc, and Ti contained in the leachate can be reduced, and rare-earth elements can be efficiently separated and recovered as a result. In this case, Sc is separated into the pre-extracted organic phase, but, when back extraction is performed by using an alkaline aqueous solution having a pH of 7.5 or more as a back extractant, Sc can be recovered as a solid hydroxide from the pre-extracted organic phase. In this case, Fe and Ti have already been removed, and hence pH adjustment is not required when rare-earth elements are extracted by using DEHPA as an extractant. In this case, however, emulsion sometimes occurs between the organic phase and aqueous phase at the time of solvent extraction. When the emulsion occurs, the resultant precipitate can be removed by filtration.

When the back extraction is performed, it is preferred to use a 2 N to 8 N aqueous solution of hydrochloric acid or an aqueous solution of sulfuric acid having a concentration of 30 to 70 mass % as the back extractant.

When the 2 N to 8 N aqueous solution of hydrochloric acid is used as the back extractant, the back extraction time is preferably 5 minutes or less, more preferably 0.5 to 3 minutes. When the back extraction time is 0.5 to 3 minutes, the extraction ratio of Al can be kept low, and the concentration of rare-earth elements separated and recovered can be increased as a result. When the back extraction time is more than 5 minutes, the extraction ratio of Al becomes high, and the concentration of rare-earth elements separated and recovered reduces as a result.

On the other hand, when the aqueous solution of sulfuric acid having a concentration of 30 to 70 mass % is used as the back extractant, rare-earth elements are precipitated as solid sulfates, and thus can be extremely reduced in volume. The back extraction time is preferably 5 minutes or less, more preferably 0.5 to 3 minutes. When the back extraction time is 0.5 to 3 minutes, the extraction ratio of Al can be kept low, and the concentration of rare-earth elements separated and recovered can be increased as a result. When the back extraction time is more than 5 minutes, the extraction ratio of Al becomes high, and the concentration of rare-earth elements separated and recovered reduces as a result. The rare-earth elements precipitated as solid sulfates can be recovered by performing solid-liquid separation. Note that, after the rare-earth elements are recovered, the resultant organic phase can be subjected to back extraction for 120 minutes or more by using an aqueous solution of sulfuric acid having a concentration of 30 to 70 mass as a back extractant, thereby recovering Al in the organic phase as aluminum sulfate.

When back extraction of a used extractant is performed by using a 2 N to 8 N aqueous solution of hydrochloric acid or an alkaline aqueous solution as a back extractant, Sc, Ti, and Th, which accumulate in the used extractant, can be reduced, and the resultant used extractant can be reused as a recycled extractant.

When the separation step of rare-earth elements is performed, it is desired that the separation of the crude recovered product into each element be carried out by a solvent extraction method involving using an extractant prepared by diluting an ester selected from phosphoric acid esters, phosphoric acid esters, phosphinic acid esters, thiophosphinic acid esters, and mixtures of these esters and tributyl phosphate and/or trioctylphosphine oxide with a solvent selected from aliphatic hydrocarbons such as hexane, aromatic hydrocarbons such as benzene and toluene, and kerosene, which is a petroleum fraction.

It is preferred to carry out the separation carried out by such solvent extraction method by a countercurrent multistage solvent extraction method.

In the separation step of the leachate in the present invention, in the case of the hydroxide precipitation method, as described above, the pH value of the leachate is first adjusted to 4 to 6, hydroxides of Fe and Al precipitated by this pH adjustment are removed by solid-liquid separation, a pH adjuster is then further added to adjust the pH value to 7 or more, and the precipitated hydroxides of Ca and rare-earth elements are separated by solid-liquid separation, thereby recovering a crude recovered product. Further, in the case of the oxalate method, oxalic acid is added to the leachate directly or to a liquid yielded by adjusting the pH of the leachate to cause Fe and Al to precipitate as their hydroxides, followed by solid-liquid separation, as in the hydroxide precipitation method, rare-earth elements are caused to precipitate as oxalates, the oxalates are recovered as oxalate compounds of the rare-earth elements, the oxalate compounds are treated with caustic soda, yielding hydroxides of the rare-earth elements, and the hydroxides are recovered as a crude recovered product, or the oxalate compounds of the rare-earth elements are calcined, yielding oxides of the rare-earth elements, and the oxides are recovered as a crude recovered product. The crude recovered product is dissolved in hydrochloric acid or nitric acid, followed by solvent extraction by using an extractant, and there is an advantage in that the amount of an expensive extractant to be used in the solvent extraction can be reduced as much as possible.

EXAMPLES

The method of recovering rare-earth elements according to the present invention is hereinafter specifically described by way of Examples and Comparative Examples each using a bauxite residue as a raw material for leaching, but the present invention is not limited by Examples and Comparative Examples below.

Examples 1 to 8 and Comparative Examples 1 to 5

There was used, as a raw material for leaching, a bauxite residue containing, in a solid component (S) obtained by drying the bauxite residue under the drying conditions of 110° C. and 2 hours, 29.8 mass % of Fe, 7.9 mass % of Al, 5.8 mass % of Ca, 2.1 mass % of Na, 3.5 mass % of Ti, 2.5 mass % of Si, and 0.24 mass % of rare-earth elements including Y with an atomic number of 39 and La to Lu with atomic numbers of 57 to 71. About 0.1 kg of the bauxite residue was loaded into a pressure vessel, followed by addition of water, yielding a slurry. After that, an aqueous solution of hydrochloric acid or nitric acid was added so as to attain each of the liquid-solid ratios (L/S) and initial pH values shown in Table 2, followed by mixing, preparing each slurry containing the bauxite residue.

Next, the slurry was heated and pressurized so that the temperature and pressure in the pressure vessel reached each value shown in Table 2, and was held for each time period shown in Table 2. After that, the slurry was filtrated to perform solid-liquid separation under ordinary temperature and ordinary pressure, and a leachate was recovered. Further, a solid residue obtained after the solid-liquid separation was washed with 400 cm$^3$ of washing water for 0.1 kg of the solid residue, and the washing water used for the washing and the leachate were used together as a leachate to be treated in the subsequent separation step. The pH value of the leachate was measured to determine the pH of the leachate yielded in the leaching step.

The leachate thus yielded in the leaching step of each of Examples 1 to 8 and Comparative Examples 1 to 5 was used to carry out inductively coupled plasma-atomic emission spectroscopy (ICP-AES) analysis. Measurement was performed on the content of each of the elements Y, Nd, Dy, Ca, Al, Si, Ti, and Fe in the leachate, and the leaching ratio of each element was calculated. Table 2 collectively shows the leaching conditions and results thereof.

TABLE 2

|  |  | Example | | | | | | | |
|---|---|---|---|---|---|---|---|---|---|
|  |  | 1 | 2 | 3 | 4 | 5 | 6 | 7 | 8 |
| Use amount (kg) of bauxite residue | | 0.102 | 0.108 | 0.107 | 0.100 | 0.099 | 0.111 | 0.102 | 0.103 |
| Kind of acid in leaching step | | $HNO_3$ | HCl | $HNO_3$ | $HNO_3$ | $HNO_3$ | HCl | $HNO_3$ | HCl |
| Liquid-solid ratio in slurry | | 7.5 | 7.1 | 4.2 | 4.2 | 4.2 | 7.5 | 4.1 | 7.1 |
| pH | Initial stage | <0.1 | <0.1 | <0.1 | 0.1 | 1.0 | 1.1 | 2.4 | 1.6 |
|  | After leaching | 2.4 | 1.9 | 1.8 | 2.5 | 2.6 | 2.7 | 2.9 | 2.8 |
| Leaching conditions | Temperature °C. | 225 | 230 | 225 | 250 | 180 | 200 | 225 | 200 |
|  | Pressure MPa | 2.6 | 2.8 | 2.6 | 4.0 | 1.0 | 1.6 | 2.6 | 1.6 |
|  | Time Minutes | 60 | 40 | 120 | 120 | 90 | 140 | 120 | 140 |
| Leaching ratio (mass %) | Y | 89 | 81 | 86 | 87 | 77 | 83 | 89 | 81 |
|  | Nd | 78 | 82 | 78 | 80 | 73 | 82 | 80 | 78 |
|  | Dy | 86 | 76 | 81 | 82 | 72 | 79 | 79 | 76 |
|  | Ca | 98 | 95 | 98 | 100 | 93 | 98 | 98 | 94 |
|  | Al | 63 | 55 | 59 | 38 | 24 | 26 | 20 | 14 |
|  | Si | 7 | 11 | 5 | 7 | 4 | 8 | 16 | 20 |
|  | Ti | 0.2 | 0.0 | 0.1 | 0.0 | 0.1 | 0.1 | 0.1 | 0.1 |
|  | Fe | 0.2 | 3.0 | 0.1 | 0.0 | 0.0 | 1.0 | 0.0 | 0.8 |

|  |  | Comparative Example | | | | | |
|---|---|---|---|---|---|---|---|
|  |  | 1 | 2 | 3 | 4 | 5 | 6 |
| Use amount (kg) of bauxite residue | | 0.147 | 0.101 | 0.100 | 0.100 | 0.102 | 0.099 |
| Kind of acid in leaching step | | HCl | $H_2SO_4$ | $H_3PO_4$ | $HNO_3$ | $HClO_4$ | $HNO_3$ + HCl (1:1) |
| Liquid-solid ratio in slurry | | 5.3 | 8.6 | 4.3 | 3.7 | 7.4 | 5.3 |
| pH | Initial stage | 0.2 | 1.0 | 1.1 | 3.0 | 0.6 | <0.0 |
|  | After leaching | 2.3 | 1.5 | 2.0 | 3.3 | 2.5 | <0.0 |
| Leaching conditions | Temperature °C. | 150 | 50 | 225 | 225 | 200 | 100 |
|  | Pressure MPa | 0.5 | 0.1 | 2.6 | 2.6 | 1.6 | 0.1 |
|  | Time Minutes | 180 | 30 | 120 | 120 | 140 | 60 |
| Leaching ratio (mass %) | Y | 21 | 14 | 1 | 55 | 67 | 30 |
|  | Nd | 27 | 15 | 1 | 51 | 64 | 50 |
|  | Dy | 18 | 10 | 1 | 48 | 59 | 29 |
|  | Ca | 83 | 50 | 14 | 87 | 93 | 68 |
|  | Al | 52 | 41 | 15 | 15 | 33 | 99 |
|  | Si | 30 | 100 | 7 | 28 | 11 | 1 |
|  | Ti | 0.0 | 1.6 | 0.2 | 0.2 | 0.1 | 37 |
|  | Fe | 0.7 | 1.2 | 0.3 | 0.1 | 0.1 | 100 |

As evident from the results shown in Table 2, in the leachate yielded in the leaching step of each of Examples 1 to 8, 70 mass or more of the rare-earth elements contained in the bauxite residue used as a raw material for leaching were able to be caused to leach. On the other hand, in each of Comparative Example 1, in which the leaching temperature was 150° C., Comparative Example 2, in which an aqueous solution of sulfuric acid was used as an acid aqueous solution, the liquid-solid ratio (L/S) was 8.6, and the leaching temperature was 50° C., Comparative Example 3, in which an aqueous solution of phosphoric acid was used as an acid aqueous solution, Comparative Example 4, in which the initial pH value was 3.0, Comparative Example 5, in which an aqueous solution of hypochlorous acid was used as an acid aqueous solution, and Comparative Example 6, in which the leaching temperature was 100° C., 70 mass %; or more of the rare-earth elements contained in the bauxite residue were unable to be caused to leach.

Examples 9 to 13 and Comparative Examples 6 to 8

Leaching of rare-earth elements was carried out in the same manner as that in each of Examples 1 to 8 described above, except that each oxidizing agent shown in Table 3 was added in each acid aqueous solution used in each leaching step at each equivalent weight shown in Table 3 with respect to the Fe content in the bauxite residue. Measurement was performed on the content of each of the elements Y, Nd, Dy, Ca, Al, Si, Ti, and Fe in the resultant leachate, and the leaching ratio of each element was calculated. Table 3 collectively shows the leaching conditions and results thereof.

TABLE 3

|  |  | Example | | | | | Comparative Example | | |
|---|---|---|---|---|---|---|---|---|---|
|  |  | 9 | 10 | 11 | 12 | 13 | 6 | 7 | 8 |
| Use amount (kg) of bauxite residue | | 0.103 | 0.101 | 0.109 | 0.103 | 0.105 | 0.115 | 0.100 | 0.116 |
| Kind of acid in leaching step | | HCl | $HNO_3$ | $HNO_3$ | HCl | HCl | HCl | $H_2SO_4$ | $HNO_3$ |
| Liquid-solid ratio in slurry | | 7.6 | 7.7 | 7.2 | 4.2 | 7.4 | 6.9 | 6.6 | 6.8 |
| Oxidizing agent | Kind | $H_2O_2$ | $H_2O_2$ | $H_2O_2$ | $HClO_4$ | $H_2O_2$ | $H_2O_2$ | $H_2O_2$ | $H_2O_2$ |
|  | Addition amount (*1) | 0.38 | 0.38 | 0.35 | 0.13 | 0.50 | 0.34 | 0.39 | 0.33 |
| pH | Initial stage | <0.1 | <0.1 | <0.1 | 0.2 | 1.8 | <0.1 | <0.1 | <0.1 |
|  | After leaching | 1.5 | 1.7 | 1.8 | 1.5 | 2.9 | 2.0 | 2.3 | 1.5 |

TABLE 3-continued

|  |  |  | Example | | | | | Comparative Example | | |
|---|---|---|---|---|---|---|---|---|---|---|
|  |  |  | 9 | 10 | 11 | 12 | 13 | 6 | 7 | 8 |
| Leaching conditions | Temperature | °C. | 200 | 200 | 230 | 200 | 230 | 150 | 200 | 150 |
|  | Pressure | MPa | 1.6 | 1.6 | 2.8 | 1.6 | 2.8 | 0.5 | 1.6 | 0.5 |
|  | Time | Minutes | 140 | 140 | 140 | 110 | 140 | 130 | 140 | 180 |
| Leaching ratio (mass %) | Y |  | 87 | 90 | 88 | 82 | 84 | 23 | 19 | 32 |
|  | Nd |  | 81 | 85 | 85 | 73 | 80 | 30 | 10 | 38 |
|  | Dy |  | 80 | 82 | 81 | 78 | 78 | 21 | 13 | 30 |
|  | Ca |  | 96 | 94 | 94 | 92 | 96 | 87 | 48 | 82 |
|  | Al |  | 65 | 77 | 71 | 28 | 58 | 53 | 100 | 65 |
|  | Si |  | 9 | 8 | 8 | 5 | 6 | 29 | 9 | 33 |
|  | Ti |  | 0.3 | 0.1 | 0.4 | 0.0 | 0.2 | 0.1 | 0.3 | 0.1 |
|  | Fe |  | 2.2 | 0.2 | 0.3 | 0.1 | 1.5 | 0.5 | 0.5 | 0.8 |

(*1) Equivalent weight with respect to Fe content in bauxite residue

As evident from the results shown in Table 3, in the leachate yielded in the leaching step of each of Examples 9 to 13, 70 mass % or more of the rare-earth elements contained in the bauxite residue used as a raw material for leaching were able to be caused to leach. On the other hand, in each of Comparative Examples 6 and 8, in which the leaching temperature was 150° C., and in Comparative Example 7, in which an aqueous solution of sulfuric acid was used as an acid aqueous solution, 70 mass % or more of the rare-earth elements contained in the bauxite residue were unable to be caused to leach.

Example 14

The leachate yielded in Example 4 and having the composition shown in Table 4 was used to perform, by a solvent extraction method, the removal of impurity elements and the concentration of rare-earth elements. In the solvent extraction method, first, the pH of the leachate was initially adjusted to 3.0, the resultant precipitate was removed, and the pH was adjusted to 1.5. After that, there was used an extractant prepared by diluting DEHPA with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after completion of extraction (aqueous phase after extraction).

TABLE 4

| Sample |  | $HNO_3$ leachate |
|---|---|---|
| pH |  | 2.0 |
| Component (ppm) | Y | 65.6 |
|  | La | 21.5 |
|  | Pr | 5.8 |
|  | Nd | 26.4 |
|  | Dy | 6.6 |
|  | Ca | 2,504 |
|  | Al | 2,978 |
|  | Si | 182 |
|  | Ti | 4.9 |
|  | Fe | 9.7 |

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after completion of back extraction (organic phase after back extraction) and a back-extracted aqueous phase. As a result, rare-earth elements in the extracted organic phase were transferred into the back-extracted aqueous phase, and were separated and recovered.

When a 0.02 N aqueous solution of hydrochloric acid is used as a back extractant, the organic phase after back extraction and the back extractant are brought into contact with each other at a liquid ratio of 1:1 under stirring for 3 minutes, and then the mixture is subjected to liquid-liquid separation, followed by purification, the resultant liquid can be reused cyclically as an extractant prepared by diluting DEHPA with kerosene to a concentration of 0.8 M.

Table 5 shows the recovery ratios of the rare-earth elements and impurities recovered by this solvent extraction method.

Examples 15 to 18

Rare-earth elements were transferred into the back-extracted aqueous phase, and were separated and recovered under the same conditions as those in Example 14, except that, in the same method as that in Example 14, the time of contact between the leachate and the extractant was set to 0.5 minute, 1 minute, 5 minutes, and 10 minutes.

Table 5 shows the recovery ratios of the rare-earth elements and impurities recovered by this solvent extraction method.

Examples 19 to 23

Rare-earth elements were transferred into the back-extracted aqueous phase, and were separated and recovered under the same conditions as those in Example 14, except that, in the same method as that in Example 14, the time of contact between the extracted organic phase and the back extractant was set to 0.5 minute, 1 minute, 5 minutes, 10 minutes, and 15 minutes.

Table 5 shows the recovery ratios of the rare-earth elements and impurities recovered by this solvent extraction method.

Example 24

The leachate yielded in Example 4 and having the composition shown in Table 4 was used to perform, by a solvent extraction method, the removal of impurity elements and the concentration of rare-earth elements. In the solvent extraction method, first, the pH of the leachate was initially adjusted to 1.75. After that, there was used an extractant prepared by diluting DEHPA with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after extraction. Emulsion occurred between the organic phase and the aqueous phase at the time of the solvent extraction, but the emulsion was separated into the organic phase side at the time of the liquid-liquid separation and was then removed by filtrating the organic phase with a filter.

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after back extraction and a back-extracted aqueous phase. As a result, rare-earth elements were transferred from the extracted organic phase into the back-extracted aqueous phase, and were separated and recovered.

When a 0.02 N aqueous solution of hydrochloric acid is used as a back extractant, the organic phase after back extraction and the back extractant are brought into contact with each other at a liquid ratio of 1:1 under stirring for 3 minutes, and then the mixture is subjected to liquid-liquid separation, followed by purification, the resultant liquid can be reused cyclically as an extractant prepared by diluting DEHPA with kerosene to a concentration of 0.8 M.

Table 5 shows the recovery ratios of the rare-earth elements and impurities recovered by this solvent extraction method.

Example 25

Rare-earth elements were transferred into the back-extracted aqueous phase, and were separated and recovered by the same implementation method as that in Example 14 and under the same conditions as those in Example 14, except that pH adjustment was performed by adding the same bauxite residue as that used in Example 4 instead of adding an aqueous solution of sodium hydroxide. In this case, the amount of the added bauxite residue was 0.115 kg with respect to 0.1 kg of the bauxite residue used as a raw material for leaching.

Table 5 shows the recovery ratios of the rare-earth elements and impurities recovered by this solvent extraction method. Note that, when the recovery ratios were calculated, the rare-earth elements contained in the bauxite residue used for the pH adjustment were taken into consideration, and hence recovery ratios with respect to 2.15 times the amount of the bauxite residue used as a raw material for leaching are shown.

TABLE 5

|  |  | Example | | | | | |
| --- | --- | --- | --- | --- | --- | --- | --- |
|  |  | 14 | 15 | 16 | 17 | 18 | 19 |
| Extraction time (minute(s)) |  | 3 | 0.5 | 1 | 5 | 10 | 3 |
| Back extraction time (minute(s)) |  | 3 | 3 | 3 | 3 | 3 | 0.5 |
| Recovery ratio | Y | 87 | 90 | 88 | 84 | 87 | 43 |
| (mass %) | La | 87 | 85 | 90 | 81 | 76 | 73 |
|  | Pr | 94 | 98 | 93 | 92 | 90 | 93 |
|  | Nd | 96 | 98 | 96 | 94 | 92 | 94 |
|  | Dy | 100 | 100 | 100 | 100 | 100 | 88 |
|  | Ca | 39 | 53 | 44 | 33 | 29 | 41 |
|  | Al | 1 | 1 | 1 | 2 | 2 | 0 |
|  | Si | 0 | 0 | 0 | 0 | 0 | 0 |
|  | Ti | 4 | 4 | 5 | 3 | 3 | 3 |
|  | Fe | 32 | 19 | 29 | 35 | 36 | 29 |

|  |  | Example | | | | | |
| --- | --- | --- | --- | --- | --- | --- | --- |
|  |  | 20 | 21 | 22 | 23 | 24 | 25 |
| Extraction time (minute(s)) |  | 3 | 3 | 3 | 3 | 3 | 3 |
| Back extraction time (minute(s)) |  | 1 | 5 | 10 | 15 | 3 | 3 |
| Recovery ratio | Y | 76 | 88 | 89 | 89 | 78 | 70 |
| (mass %) | La | 77 | 77 | 77 | 77 | 71 | 63 |
|  | Pr | 95 | 95 | 95 | 95 | 87 | 64 |
|  | Nd | 96 | 96 | 96 | 96 | 89 | 63 |
|  | Dy | 100 | 100 | 100 | 100 | 90 | 77 |
|  | Ca | 43 | 43 | 41 | 44 | 41 | 14 |
|  | Al | 1 | 2 | 3 | 4 | 1 | 1 |
|  | Si | 0 | 0 | 0 | 0 | 0 | 0 |
|  | Ti | 4 | 4 | 4 | 4 | 3 | 0 |
|  | Fe | 28 | 28 | 30 | 30 | 32 | 4 |

It is found, on the basis of the recovery ratios of the rare-earth elements and impurities in Examples 14 to 23 shown in Table 5, that as the extraction time is shorter, the recovery ratios of the rare-earth elements are higher, that as the back extraction time is longer, the recovery ratios of the rare-earth elements are higher, but even Y, which shows the lowest recovery ratio, shows a recovery ratio exceeding 75 mass % for a back extraction time of 1 minute, and that as both the extraction time and back extraction time are longer, the recovery ratios of impurities such as Al are higher.

It is found on the basis of the results of Example 24 that, when emulsion occurs between the organic phase and the aqueous phase at the time of the solvent extraction, the recovery ratios of the rare-earth elements in Example 24 are slightly lower in comparison to those in Example 14, in which the extraction time and back extraction time are the same as those in Example 24.

Further, in Example 25, in which pH adjustment was performed by adding a bauxite residue, rare-earth elements which dissolved from the bauxite residue added at the time of the pH adjustment were also recovered, but the recovery ratios of the rare-earth elements were not as high as the recovery ratios of the rare-earth elements which were caused to leach from the bauxite residue used as a raw material for leaching. Thus, it is found that the recovery ratios in Example 25 are lower than those in Example 14, but Ca and Ti coprecipitate with Fe and the concentrations of these elements are significantly reduced. In addition, the bauxite residue is produced as a by-product in a Bayer process for producing aluminum from bauxite, resulting in a cost reduction.

Example 26

The leachate yielded in Example 4 and having the composition shown in Table 4 was used to perform, by a solvent extraction method, the removal of impurity elements and the concentration of rare-earth elements. In the solvent extraction method, first, the pH of the leachate was initially adjusted to 3.0, the resultant precipitate was removed, and the pH was adjusted to 1.0. After that, there was used an extractant prepared by diluting DEHPA with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after extraction.

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after back extraction and a back-extracted aqueous phase. As a result, rare-earth elements were transferred from the extracted organic phase into the back-extracted aqueous phase, and were separated and recovered.

When a 0.02 N aqueous solution of hydrochloric acid is used as a back extractant, the organic phase after back extraction and the back extractant are brought into contact with each other at a liquid ratio of 1:1 under stirring for 3 minutes, and then the mixture is subjected to liquid-liquid separation, followed by purification, the resultant liquid can be reused cyclically as an extractant prepared by diluting DEHPA with kerosene to a concentration of 0.8 M.

Table 6 shows the recovery ratios of the rare-earth elements and impurities recovered by this solvent extraction method.

Examples 27 and 28

Rare-earth elements were transferred into the back-extracted aqueous phase, and were separated and recovered under the same conditions as those in Example 26, except that, in the same method as that in Example 26, an extractant prepared by diluting DEHPA with kerosene to a concentration of 1.2 M and an extractant prepared by diluting DEHPA with kerosene to a concentration of 1.5 M were used.

Table 6 shows the recovery ratios of the rare-earth elements and impurities recovered by this solvent extraction method.

Examples 29 and 30

Rare-earth elements were transferred into the back-extracted aqueous phase, and were separated and recovered under the same conditions as those in Example 26, except that, in the same method as that in Example 26, the pH of the leachate was initially adjusted to 3.0, the resultant precipitate was removed, and the pH was again adjusted to 1.5 or 2.0.

Table 6 shows the recovery ratios of the rare-earth elements and impurities recovered by this solvent extraction method.

Example 31

The leachate yielded in Example 4 and having the composition shown in Table 4 was used to perform, by a solvent extraction method, the removal of impurity elements and the concentration of rare-earth elements. In the solvent extraction method, first, the pH of the leachate was initially adjusted to 3.0, the resultant precipitate was removed, and the pH was again adjusted to 2.0. After that, there was used an extractant prepared by diluting PC88A with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after extraction.

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after back extraction and a back-extracted aqueous phase. As a result, rare-earth elements were transferred from the extracted organic phase into the back-extracted aqueous phase, and were separated and recovered.

When a 0.02 N aqueous solution of hydrochloric acid is used as a back extractant, the organic phase after back extraction and the back extractant are brought into contact with each other at a liquid ratio of 1:1 under stirring for 3 minutes, and then the mixture is subjected to liquid-liquid separation, followed by purification, the resultant liquid can be reused cyclically as an extractant prepared by diluting PC88A with kerosene to a concentration of 0.8 M.

Table 6 shows the recovery ratios of the rare-earth elements and impurities recovered by this solvent extraction method.

Examples 32 to 34

Rare-earth elements were transferred into the back-extracted aqueous phase, and were separated and recovered under the same conditions as those in Example 31, except that, in the same method as that in Example 31, an extractant prepared by diluting PC88A with kerosene to a concentration of 0.5 to 1.5 M was used.

Table 6 shows the recovery ratios of the rare-earth elements and impurities recovered by this solvent extraction method.

Examples 35 to 37

Rare-earth elements were transferred into the back-extracted aqueous phase, and were separated and recovered under the same conditions as those in Example 31, except that, in the same method as that in Example 31, the pH of the leachate was initially adjusted to 3.0, the resultant precipitate was removed, and the pH was again adjusted to 1.5 to 3.0.

Table 6 shows the recovery ratios of the rare-earth elements and impurities recovered by this solvent extraction method.

TABLE 6

| | | Example | | | | | |
|---|---|---|---|---|---|---|---|
| | | 26 | 27 | 28 | 29 | 30 | 31 |
| Kind of extractant | | DEHPA | DEHPA | DEHPA | DEHPA | DEHPA | PC88A |
| Concentration (M) of extractant | | 0.8 | 1.2 | 1.5 | 0.8 | 0.8 | 0.8 |
| Adjusted value of pH of leachate | | 1.0 | 1.0 | 1.0 | 1.5 | 2.0 | 2.0 |
| Recovery ratio | Y | 100 | 93 | 80 | 100 | 96 | 94 |
| (mass %) | La | 26 | 51 | 64 | 80 | 97 | 5 |
| | Pr | 76 | 91 | 100 | 100 | 100 | 39 |
| | Nd | 83 | 97 | 100 | 100 | 100 | 50 |
| | Dy | 100 | 100 | 100 | 100 | 100 | 94 |
| | Ca | 11 | 24 | 33 | 37 | 55 | 1 |
| | Al | 0 | 0 | 0 | 1 | 1 | 8 |
| | Si | 0 | 0 | 0 | 0 | 0 | 0 |
| | Ti | 3 | 2 | 1 | 3 | 3 | 0 |
| | Fe | 9 | 9 | 8 | 22 | 31 | 70 |

| | | Example | | | | | |
|---|---|---|---|---|---|---|---|
| | | 32 | 33 | 34 | 35 | 36 | 37 |
| Kind of extractant | | PC88A | PC88A | PC88A | PC88A | PC88A | PC88A |
| Concentration (M) of extractant | | 0.5 | 1.2 | 1.5 | 0.8 | 0.8 | 0.8 |
| Adjusted value of pH of leachate | | 2.0 | 2.0 | 2.0 | 1.5 | 2.5 | 3.0 |
| Recovery ratio | Y | 97 | 94 | 94 | 88 | 97 | 100 |
| (mass %) | La | 2 | 12 | 18 | 1 | 9 | 10 |

TABLE 6-continued

| | | | | | | |
|---|---|---|---|---|---|---|
| Pr | 18 | 56 | 65 | 11 | 56 | 63 |
| Nd | 25 | 69 | 77 | 14 | 68 | 76 |
| Dy | 97 | 97 | 91 | 87 | 100 | 100 |
| Ca | 1 | 2 | 2 | 1 | 1 | 1 |
| Al | 7 | 9 | 8 | 4 | 11 | 13 |
| Si | 0 | 0 | 0 | 0 | 0 | 0 |
| Ti | 0 | 0 | 0 | 0 | 1 | 0 |
| Fe | 82 | 61 | 48 | 65 | 79 | 73 |

It is found, on the basis of the recovery ratios of the rare-earth elements and impurities in Examples 26 to 37 shown in Table 6, that the use of DEHPA shows higher recovery ratios of the rare-earth elements but lower recovery ratios of Al than the use of PC88A, that as the pH of the leachate is higher in both the case of using DEHPA as an extractant and the case of using PC88A as an extractant, the recovery ratios of both the rare-earth elements and Al tend to be higher, that when DEHPA is used as an extractant, as the concentration thereof is higher, the recovery ratios of both the rare-earth elements and Al are higher, and that when PC88A is used as an extractant, as the concentration thereof is higher, the recovery ratios of the rare-earth elements are higher, but the recovery ratio of Al has its maximum point near the concentration of 1.2 M.

Examples 38 to 43

The leachate yielded in Example 4 and having the composition shown in Table 4 was used to perform, by a solvent extraction method including pre-extraction, the removal of impurity elements and the concentration of rare-earth elements. In this method, first, the pH of the leachate was initially adjusted to 3.0, the resultant precipitate was removed, and the pH was again adjusted to 1.0 or 1.25. After that, there was used a pre-extractant prepared by diluting PC88A with kerosene to a concentration of 0.01 to 0.02 M, and the leachate and the pre-extractant were brought into contact with each other at a liquid ratio of 1:1 under stirring for 3 minutes. Then, the mixture was subjected to liquid-liquid separation into a pre-extracted organic phase and an aqueous phase after extraction. Subsequently, there was used an extractant prepared by diluting DEHPA with kerosene to a concentration of 0.8 M, and the recovered pre-extracted organic phase and the extractant were brought into contact with each other at a liquid ratio of 1:1 under stirring for 3 minutes. Then, the mixture was subjected to liquid-liquid separation into an extracted organic phase and an aqueous phase after extraction.

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after back extraction) and a back-extracted aqueous phase. As a result, rare-earth elements were transferred from the extracted organic phase into the back-extracted aqueous phase, and were separated and recovered.

When a 0.02 N aqueous solution of hydrochloric acid is used as a back extractant, the organic phase after back extraction and the back extractant are brought into contact with each other at a liquid ratio of 10:1 under stirring for 3 minutes, and then the mixture is subjected to liquid-liquid separation, followed by purification, the resultant liquid can be reused cyclically as an extractant prepared by diluting DEHPA with kerosene to a concentration of 0.8 M.

Table 7 shows the recovery ratios of the rare-earth elements and impurities recovered by this solvent extraction method.

TABLE 7

| | | Example | | | | | |
|---|---|---|---|---|---|---|---|
| | | 38 | 39 | 40 | 41 | 42 | 43 |
| Concentration (M) of extractant | | 0.01 | 0.015 | 0.02 | 0.01 | 0.015 | 0.02 |
| Adjusted value of pH of leachate | | 1.0 | 1.0 | 1.0 | 1.25 | 1.25 | 1.25 |
| Recovery ratio (mass %) | Y | 95 | 90 | 94 | 78 | 76 | 75 |
| | La | 24 | 24 | 23 | 45 | 45 | 43 |
| | Pr | 69 | 67 | 70 | 70 | 68 | 67 |
| | Nd | 75 | 78 | 74 | 74 | 72 | 72 |
| | Dy | 91 | 93 | 91 | 81 | 79 | 77 |
| | Ca | 9 | 8 | 10 | 18 | 18 | 18 |
| | Al | 0 | 0 | 0 | 1 | 1 | 1 |
| | Si | 0 | 0 | 0 | 0 | 0 | 0 |
| | Ti | 2 | 1 | 1 | 1 | 1 | 1 |
| | Fe | 8 | 8 | 8 | 17 | 16 | 15 |

It is found, on the basis of the recovery ratios of the rare-earth elements and impurities in Examples 38 to 43 shown in Table 7, that the recovery ratios of the rare-earth elements are kept at almost the same level in comparison to those in Example 26, but the recovery ratios of Ca and Ti among the impurities are significantly lowered.

Examples 44 to 52

The leachate yielded in Example 4 and having the composition shown in Table 4 was used to perform, by a solvent extraction method, the removal of impurity elements and the concentration of rare-earth elements. In the solvent extraction method, first, the pH of the leachate was initially adjusted to 3.0, the resultant precipitate was removed, and the pH was again adjusted to 1.0. After that, there was used an extractant prepared by diluting DEHPA with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after extraction.

A 50 mass % aqueous solution of sulfuric acid was used as a back extractant, and the extracted organic phase and the back extractant were brought into contact with each other at a liquid ratio of 1:1 under stirring for 1 to 180 minutes. Elements including the rare-earth elements were precipitated as solid sulfates, and hence the solid sulfates containing the rare-earth elements were recovered by solid-liquid separation.

When a 0.02 N aqueous solution of hydrochloric acid is used as a back extractant, the organic phase after back extraction and the back extractant are brought into contact with each other at a liquid ratio of 1:1 under stirring for 3 minutes, and then the mixture is subjected to liquid-liquid separation, followed by purification, the resultant liquid can be reused cyclically as an extractant prepared by diluting DEHPA with kerosene to a concentration of 0.8 M.

Table 8 shows the recovery ratios of the rare-earth elements and impurities recovered by this solvent extraction method.

TABLE 8

|  |  | Example | | | | |
| --- | --- | --- | --- | --- | --- | --- |
|  |  | 44 | 45 | 46 | 47 | 48 |
| Back extraction time (minute(s)) | | 1 | 3 | 5 | 30 | 60 |
| Recovery ratio | Y | 44 | 91 | 95 | 95 | 95 |
| (mass %) | La | 21 | 23 | 23 | 23 | 23 |
|  | Pr | 57 | 62 | 63 | 63 | 63 |
|  | Nd | 64 | 69 | 69 | 69 | 69 |
|  | Dy | 80 | 100 | 100 | 100 | 100 |
|  | Ca | 10 | 11 | 11 | 11 | 11 |
|  | Al | 0.0 | 0.0 | 0.0 | 0.1 | 0.1 |
|  | Si | 0 | 0 | 0 | 0 | 0 |
|  | Ti | 3 | 0 | 0 | 0 | 0 |
|  | Fe | 0 | 0 | 0 | 0 | 0 |

|  |  | Example | | | |
| --- | --- | --- | --- | --- | --- |
|  |  | 49 | 50 | 51 | 52 |
| Back extraction time (minute(s)) | | 90 | 120 | 150 | 180 |
| Recovery ratio | Y | 95 | 95 | 95 | 95 |
| (mass %) | La | 23 | 23 | 23 | 23 |
|  | Pr | 63 | 61 | 60 | 60 |
|  | Nd | 69 | 69 | 69 | 69 |
|  | Dy | 100 | 100 | 100 | 99 |
|  | Ca | 11 | 11 | 11 | 11 |
|  | Al | 0.1 | 0.2 | 0.2 | 0.2 |
|  | Si | 0 | 0 | 0 | 0 |
|  | Ti | 0 | 0 | 0 | 0 |
|  | Fe | 0 | 0 | 0 | 0 |

It is found, on the basis of the recovery ratios of the rare-earth elements and impurities in Examples 44 to 52 shown in Table 8, that Fe and Ti are hardly recovered, but the rare-earth elements can be each recovered at a high recovery ratio, and that as the back extraction time is longer, the recovery ratio of Al is higher, but when the back extraction time is 5 minutes or less, the recovery ratio of Al can be kept at a low value of less than 0.1%.

Example 53

The leachate yielded in Example 4 and having the composition shown in Table 4 was used to perform the removal of impurity elements and the concentration of rare-earth elements by the two-stage solvent extraction method illustrated in FIG. 1. The details are hereinafter described with reference to FIG. 1.

The two-stage solvent extraction method was performed as follows. First, in an extraction operation A (Ext. A), the pH of a leachate (1) was adjusted to 2.0, an extractant prepared by diluting DEHPA with hexane to a concentration of 0.02 M was then used, the leachate (1) and the extractant were brought into contact with each other at a liquid ratio of 1:1 under stirring for 3 minutes, and then the mixture was subjected to liquid-liquid separation into an extracted organic phase A (2) and an aqueous phase after extraction A (3).

In this case, Y and Dy are contained in the extracted organic phase A (2), and the rare-earth elements ranging from La to Nd are contained in the aqueous phase after extraction A (3).

For the extracted organic phase A (2), in a back extraction operation A (R-Ext. A), a 0.2 N aqueous solution of hydrochloric acid was used as a back extractant, the extracted organic phase A (2) and the back extractant were brought into contact with each other at a liquid ratio of 1:1 under stirring for 3 minutes, the mixture was then subjected to liquid-liquid separation again into an organic phase after back extraction A (4) and a back-extracted aqueous phase A (5), and Y and Dy were separated from the extracted organic phase A (2) into the back-extracted aqueous phase A (5).

For the organic phase after back extraction A (4), in a purification operation (P), a 2 N aqueous solution of hydrochloric acid is used as a back extractant, the organic phase after back extraction A (4) and the back extractant are brought into contact with each other at a liquid ratio of 1:1 under stirring for 3 minutes, and then the mixture is subjected to liquid-liquid separation, followed by purification. Then, the resultant liquid can be reused cyclically as an extractant prepared by diluting DEHPA with hexane to a concentration of 0.02 M, and the used back extractant is discarded as a waste liquid (W).

Further, for the above-mentioned back-extracted aqueous phase A (5) containing Y and Dy separated from the extracted organic phase] A (2), in an extraction B (Ext. B), an extractant prepared by diluting DEHPA with hexane to a concentration of 0.02 M was used, the back-extracted aqueous phase A (5) and the extractant were brought into contact with each other at a liquid ratio of 1:1 under stirring for 5 minutes, and then the mixture was subjected to liquid-liquid separation into an extracted organic phase B (6) and an aqueous phase after extraction B (7), discarding the aqueous phase after extraction B (7) as a waste liquid (8).

For the above-mentioned extracted organic phase B (6), in a back extraction operation B (R-Ext. B), a 2 N aqueous solution of hydrochloric acid was used as a back extractant, the extracted organic phase B (6) and the back extractant were brought into contact with each other at a liquid ratio of 1:1 under stirring for 5 minutes, the mixture was then subjected to liquid-liquid separation into an organic phase after back extraction B (9) and a back-extracted aqueous phase B (10), and Y and Dy were separated by being transferred from the extracted organic phase B (6) to the above-mentioned back-extracted aqueous phase B (10) and were recovered as a recovery No. 1 (11).

When the organic phase after back extraction B (9) is subjected to the same treatment as that in the above-mentioned purification operation (P) (not shown), the resultant liquid can be reused cyclically as an extractant prepared by diluting DEHPA with hexane to a concentration of 0.02 M.

On the other hand, after the pH of the above-mentioned aqueous phase after extraction A (3) was adjusted to 2, there was performed an extraction operation C (Ext. C), in which an extractant prepared by diluting DEHPA with hexane to a concentration of 0.8 M was used, the aqueous phase after extract ion A (3) and the extractant were brought into contact with each other at a liquid ratio of 1:1 under stirring for 3 minutes, and then the mixture was subjected to liquid-liquid separation into an extracted organic phase C (12) and an aqueous phase after extraction C (13), discarding the aqueous phase after extraction C (13) as a waste liquid (14).

For the above-mentioned extracted organic phase C (12), in a back extraction operation C (R-Ext. C), a 0.1 N aqueous solution of hydrochloric acid was used as a back extractant, the extracted organic phase C (12) and the back extractant were brought into contact with each other at a liquid ratio of 1:1 under stirring for 5 minutes, and the mixture was then subjected to liquid-liquid separation into an organic phase after back extraction C (15) and a back-extracted aqueous phase C (16). As a result, Ca was removed from the extracted organic phase C (12) and the back-extracted aqueous phase C (16) containing Ca was discarded as a waste liquid (17).

Then, for the above-mentioned organic phase after back extraction C (15), in a back extraction operation D (R-Ext. D), a 2 N aqueous solution of hydrochloric acid was used as a back extractant, the organic phase after back extraction C (15)

and the back extractant were brought into contact with each other at a liquid ratio of 1:1 under stirring for 5 minutes, the mixture was then subjected to liquid-liquid separation into an organic phase after back extraction D (18) and a back-extracted aqueous phase D (19), and the rare-earth elements ranging from La to Nd were separated from the organic phase after back extraction C (15) into the back-extracted aqueous phase D (19). Oxalic acid was added to the back-extracted aqueous phase D (19), thereby causing rare-earth oxalates to precipitate, and the rare-earth elements ranging from La to Nd were recovered as a recovery No. 2 (20).

When the organic phase after back extraction D (18) is subjected to the same treatment as that in the above-mentioned purification operation (P) (not shown), the resultant liquid can be reused cyclically as an extractant prepared by diluting DEHPA with hexane to a concentration of 0.8 M.

Table 9 shows the recovery ratios of the rare-earth elements recovered by this two-stage solvent extraction method and the concentrations of the impurities.

Example 54

The leachate yielded in Example 4 and having the composition shown in Table 4 was used to perform, by an oxalate precipitation method, the removal of impurity elements and the concentration of rare-earth elements. In the oxalate precipitation method, oxalic acid was added to the leachate of Example 4 at about 1.5 chemical equivalent weights with respect to the rare-earth ions contained in the leachate, only the rare-earth elements were caused to precipitate as oxalates, and solid-liquid separation was performed, thereby recovering the rare-earth oxalates.

Table 9 shows the recovery ratios of the rare-earth elements recovered by the oxalate precipitation method and the concentrations of the impurities.

Example 55

The leachate yielded in Example 4 and having the composition shown in Table 4 was used to perform, by a hydroxide precipitation method, the removal of impurity elements and the concentration of rare-earth elements. In the hydroxide precipitation method, first, the pH of the leachate of Example 4 was adjusted to pH 4.5 at which the solubility of Al ions and the solubility of Fe ions were small and the solubility of rare-earth ions was large, thereby causing Al and Fe to precipitate as hydroxides, and the precipitated hydroxides of Al and Fe were removed by solid-liquid separation. After that, a caustic soda solution was further added to the resultant liquid, increasing the pH thereof to 11, rare-earth ions were caused to precipitate as hydroxides, and solid-liquid separation was performed, thereby recovering the rare-earth hydroxides.

Table 9 shows the recovery ratios of the rare-earth elements recovered by the hydroxide precipitation method and the concentrations of the impurities.

TABLE 9

| | | Impurity separation method | | | |
|---|---|---|---|---|---|
| | | Example 53 Two-stage solvent extraction method | | Example 54 Oxalate | Example 55 Hydroxide |
| | | Recovery No. 1 | Recovery No. 2 | precipitation method | precipitation method |
| Recovery ratio (mass%) | Y | 92.0 | 0.2 | 95.1 | 85.8 |
| | La | 1.3 | 40.1 | 98.4 | 89.7 |
| | Pr | 0.0 | 91.7 | 96.2 | 84.3 |
| | Nd | 0.0 | 96.9 | 95.9 | 84.5 |

TABLE 9-continued

| | Impurity separation method | | | |
|---|---|---|---|---|
| | Example 53 Two-stage solvent extraction method | | Example 54 Oxalate | Example 55 Hydroxide |
| | Recovery No. 1 | Recovery No. 2 | precipitation method | precipitation method |
| Dy | 97.1 | 2.1 | 93.5 | 82.4 |
| Ca | 0.2 | 1.0 | 8.4 | 5.4 |
| Al | 0.8 | 0.0 | 0.06 | 0.89 |
| Si | 0.1 | 0.0 | 0.17 | 2.99 |
| Ti | 23.7 | 0.0 | 1.31 | 0.00 |
| Fe | 21.3 | 0.2 | 0.10 | 0.30 |

The invention claimed is:

1. A method of recovering rare-earth elements, comprising:
a leaching step including preparing a slurry by adding water to a raw material for leaching which contains rare-earth elements, followed by mixing, further adding an acid aqueous solution to the slurry, followed by mixing, to adjust a pH of the slurry, performing leaching treatment in which the rare-earth elements in the raw material for leaching are transferred into the acid aqueous solution while the slurry is held under a predetermined condition, and then subjecting the slurry, which is obtained after the leaching treatment to solid-liquid separation, thereby yielding a leachate containing the rare-earth elements; and
a separation step of separating and recovering the rare-earth elements from the leachate yielded in the leaching step, wherein:
the raw material for leaching comprises Ca as CaO at a ratio of from 4 to 15 mass % and Ti as $TiO_2$ at a ratio of from 2 to 13 mass % in a solid component (S) obtained by drying the raw material for leaching under drying conditions of 110° C. and 2 hours;
the acid aqueous solution comprises an acid aqueous solution which contains hydrochloric acid and/or nitric acid and adjusts the pH to from 0 to 2.7; and
the leaching treatment performed in the leaching step is digestion or maceration which is performed under heating and pressurizing conditions of a temperature of from 160 to 300° C. and a pressure of from 0.65 to 10 MPa, and the rare-earth elements in the raw material for leaching are caused to leach together with Ca in the leaching step.

2. A method of recovering rare-earth elements according to claim 1, wherein the digestion or maceration in the leaching step is performed until a dissolution ratio of Ca contained in the raw material for leaching reaches 90 mass % or more.

3. A method of recovering rare-earth elements according to claim 1, wherein the raw material for leaching comprises a bauxite residue produced as a by-product in a Bayer process for collecting an aluminum component from bauxite by using an aqueous solution of sodium hydroxide.

4. A method of recovering rare-earth elements according to claim 3, wherein the bauxite residue comprises rare-earth elements as oxides thereof at a ratio of from 500 to 10,000 ppm in a solid component (S) obtained by drying the bauxite residue under drying conditions of 110° C. and 2 hours.

5. A method of recovering rare-earth elements according to claim 3, wherein the slurry obtained by adding the acid aqueous solution to the bauxite residue has a liquid-solid ratio (L/S) of a liquid component (L) and a solid component (S) of from 2 to 10 and a pH value of from 0 to 2.7.

6. A method of recovering rare-earth elements according to claim 3, further comprising adding an oxidizing agent into the slurry prepared by adding the acid aqueous solution to the bauxite residue, at a ratio of from 0.1 to 1 equivalent weight with respect to an Fe component in the bauxite residue.

7. A method of recovering rare-earth elements according to claim 6, wherein the oxidizing agent added into the slurry is a hydrogen peroxide solution or a perchloric acid aqueous solution.

8. A method of recovering rare-earth elements according to claim 1, further comprising:
adjusting a pH of the leachate yielded in the leaching step to from 4 to 6 by adding a pH adjuster to the leachate;
removing, by solid-liquid separation, hydroxides of Fe and Al precipitated owing to the adjusting of the pH; and
subjecting a resultant liquid to the separation step.

9. A method of recovering rare-earth elements according to claim 8, wherein the adjusting of the pH to from 4 to 6 by adding the pH adjuster to the leachate comprises adding, to the leachate, an oxidizing agent selected from hydrogen peroxide, perchloric acid, permanganic acid, and hypochlorous acid to oxidize $Fe^{2+}$ ions into $Fe^{3+}$ ions in the leachate.

10. A method of recovering rare-earth elements according to claim 1, wherein the separation step of the rare-earth elements comprises:
adding a pH adjuster to the leachate yielded in the leaching step or to a liquid yielded by adjusting a pH of the leachate to cause Fe and Al to precipitate as hydroxides thereof, followed by solid-liquid separation to adjust a pH of the leachate or the liquid to 7 or more; and
separating hydroxides of Ca and the rare-earth elements, which are caused to precipitate owing to the pH adjustment, by solid-liquid separation to recover the hydroxides as a crude recovered product.

11. A method of recovering rare-earth elements according to claim 10, further comprising separating the crude recovered product into each element by dissolving the crude recovered product in an acid aqueous solution and carrying out a solvent extraction method which uses an extractant prepared by diluting an ester selected from phosphoric acid esters, phosphonic acid esters, phosphinic acid esters, thiophosphinic acid esters, and mixtures of these esters and tributyl phosphate and/or trioctylphosphine oxide with a solvent selected from hexane, benzene, toluene, and kerosene.

12. A method of recovering rare-earth elements according to claim 11, wherein the separation of the crude recovered product into the each element by the solvent extraction method comprises a countercurrent multistage solvent extraction method.

13. A method of recovering rare-earth elements according to claim 1, wherein the separation step of the rare-earth elements comprises:
adding oxalic acid to the leachate yielded in the leaching step or to a liquid yielded by adjusting a pH of the leachate to cause Fe and Al to precipitate as hydroxides thereof, followed by solid-liquid separation, at a ratio of a chemical equivalent weight equal to or more than that of the rare-earth elements existing therein, to cause the rare-earth elements to precipitate as oxalates thereof; and
separating the oxalates by solid-liquid separation to recover the rare-earth elements as a crude recovered product.

14. A method of recovering rare-earth elements according to claim 1, wherein the separation step of the rare-earth elements comprises:
adding an extractant to the leachate yielded in the leaching step or to a liquid yielded by adjusting a pH of the leachate to cause Fe and Al to precipitate as hydroxides thereof, followed by solid-liquid separation, the extractant being prepared by diluting an ester selected from phosphoric acid esters, phosphonic acid esters, phosphinic acid esters, thiophosphinic acid esters, and mixtures of these esters and tributyl phosphate and/or trioctylphosphine oxide with a solvent selected from hexane, benzene, toluene, octanol, and kerosene; and
separating and recovering the rare-earth elements by a solvent extraction method.

15. A method of recovering rare-earth elements according to claim 14, further comprising, prior to the separation step by the solvent extraction method, removing emulsion which occurs during the adjusting of the pH of the leachate in advance by filtration.

16. A method of recovering rare-earth elements according to claim 14, further comprising:
prior to the separation step by the solvent extraction method, adjusting the pH of the leachate to from 2.5 to 3.5; and
removing the resultant precipitate.

17. A method of recovering rare-earth elements according to claim 16, wherein the adjusting of the pH performed prior to the separation step by the solvent extraction method comprises adding a bauxite residue.

18. A method of recovering rare-earth elements according to claim 14, wherein the extractant used in the solvent extraction method comprises bis(2-ethylhexyl)hydrogen phosphate).

19. A method of recovering rare-earth elements according to claim 18, wherein the bis(2-ethylhexyl)hydrogen phosphate) serving as the extractant used in the solvent extraction method has a concentration of from 0.1 to 1.5 M.

20. A method of recovering rare-earth elements according to claim 18, further comprising performing pre-extraction of the leachate by using mono-2-ethylhexyl 2-ethylhexyl phosphonate, tributyl phosphate, or naphthenic acid as a pre-extractant to separate and remove Fe, Sc, and Ti from the leachate, prior to the solvent extraction method which uses the bis(2-ethylhexyl)hydrogen phosphate) as the extractant.

21. A method of recovering rare-earth elements according to claim 14, wherein an extraction time in the solvent extraction method is 5 minutes or less.

22. A method of recovering rare-earth elements according to claim 21, wherein the extraction time in the solvent extraction method is from 0.5 to 3 minutes.

23. A method of recovering rare-earth elements according to claim 14, wherein the solvent extraction method uses a 2 N to 8 N aqueous solution of hydrochloric acid as a back extractant and a back extraction time in the solvent extraction method is 5 minutes or less.

24. A method of recovering rare-earth elements according to claim 23, wherein the back extraction time in the solvent extraction method is from 0.5 to 3 minutes.

25. A method of recovering rare-earth elements according to claim 14, wherein the solvent extraction method uses an aqueous solution of sulfuric acid having a concentration of from 30 to 70 mass % as a back extractant and the rare-earth elements are recovered as solid sulfates.

26. A method of recovering rare-earth elements according to claim 25, wherein a back extraction time in the solvent extraction method is 5 minutes or less.

27. A method of recovering rare-earth elements according to claim 14, wherein the solvent extraction method comprises:
    subjecting a used extractant to back extraction by using a 2 N to 8 N aqueous solution of hydrochloric acid or an alkaline aqueous solution as a back extractant to reduce Sc, Ti, and Th accumulating in the used extractant; and
    using the resultant used extractant as a recycled extractant.

* * * * *